United States Patent
Schmidt

[11] Patent Number: 5,899,060
[45] Date of Patent: May 4, 1999

[54] WALL STRUCTURE FOR FUEL-COOLED ROCKET ENGINE WALLS

[75] Inventor: Günther Schmidt, Taufkirchen, Germany

[73] Assignee: Daimler-Benz Aerospace AG, Ottobrunn, Germany

[21] Appl. No.: 08/787,389

[22] Filed: Jan. 22, 1997

[30] Foreign Application Priority Data

Jan. 26, 1996 [DE] Germany .......................... 196 02 731

[51] Int. Cl.⁶ .................................................. F02K 11/00
[52] U.S. Cl. ........................ 60/267; 60/39.32; 165/155; 165/169
[58] Field of Search .............................. 60/265, 266, 267, 60/752, 754, 755, 730, 39.32; 165/155, 156, 106

[56] References Cited

U.S. PATENT DOCUMENTS

| | | | |
|---|---|---|---|
| 2,548,485 | 4/1951 | Lubbock | 60/265 |
| 3,190,070 | 6/1965 | Neu, Jr. | 60/267 |
| 3,242,670 | 3/1966 | Buswell | 60/267 |
| 3,267,664 | 8/1966 | Jones et al. | 60/267 |
| 3,493,177 | 2/1970 | Bromberg et al. | 60/267 |
| 3,832,290 | 8/1974 | Fortini | 60/267 |
| 3,832,847 | 9/1974 | Butter et al. | 60/267 |
| 4,078,604 | 3/1978 | Christl et al. | 60/267 |
| 4,840,226 | 6/1989 | Richlen | 166/155 |
| 5,172,548 | 12/1992 | Dubedout et al. | 60/265 |
| 5,174,368 | 12/1992 | Boury et al. | 60/267 |
| 5,226,598 | 7/1993 | Woehrl | 60/267 |
| 5,647,202 | 7/1997 | Althaus | 60/752 |

FOREIGN PATENT DOCUMENTS

| | | |
|---|---|---|
| PS 17 51 691 | 1/1973 | Germany . |
| PS 21 37 109 | 4/1980 | Germany . |

*Primary Examiner*—Timothy S. Thorpe
*Assistant Examiner*—Ted Kim
*Attorney, Agent, or Firm*—McGlew and Tuttle, P.C.

[57] ABSTRACT

A wall structure for fuel-cooled engine walls, with a cooling structure having an inner wall to which hot gas is admitted; an outer wall located at a spaced location therefrom; as well as a plurality of webs, which connect the two walls and divide the intermediate space between the walls into cooling channels (19), and with a support structure in the form of at least one stable outer jacket. The cooling structure is slotted from the outside in the area of each web, wherein the slots (22) pass through the outer walls and the centers of the webs into the area of the inner wall. The support structure is designed as an elastically nonrigid support structure at least in the area joining the cooling structure and/or is located at a spaced location from the cooling structure.

17 Claims, 1 Drawing Sheet

WALL STRUCTURE FOR FUEL-COOLED ROCKET ENGINE WALLS

FIELD OF THE INVENTION

The present invention pertains to a wall structure for fuel-cooled engine walls, especially for cryogenic fuel-cooled combustion chamber and thrust nozzle walls of rocket engines, with a cooling structure, which comprises an inner wall, to which hot gas is admitted during the operation, an outer wall, which is located at a spaced location therefrom and is colder during the operation, as well as a plurality of webs which connect the inner wall to the outer wall and divide the hollow space present between these into a large number of cooling channels, and with a support structure, which joins the outer wall and comprises at least a mechanically stable outer jacket.

BACKGROUND OF THE INVENTION

A corresponding wall structure for combustion chambers and thrust nozzles of liquid-fueled rocket engines has been known from, e.g., DE-PS 17 51 691. The cooling channels are incorporated in the wall structure described there in a one-piece basic body made of a material having good thermal conductivity, preferably copper, so that the hot gas-side inner wall and the radial webs between the cooling channels are integrally connected and consist of the same material. A layer of the same material as the basic body is applied as a thin outer wall to the webs from the outside by electroplating. This layer also acts as an adhesive layer for the relatively thick-walled outer jacket/pressure jacket made of a high-strength material having poor thermal conductivity, preferably nickel, which is subsequently applied by electroplating. This outer jacket also absorbs essentially the loads arising from the internal pressure in the combustion chamber and the nozzle via the webs and the thin outer wall.

The following processes take place during the operation of such a wall structure: Hydrogen having a temperature of, e.g., 30 to 200 K flows through the cooling channels, and the load-bearing outer jacket assumes approximately this temperature and its diameter even shrinks. This effect is further reinforced by stratification effects in the cooling agent, whose temperature increases at the inner bottom of the channel, i.e., at the inner wall, but remains relatively low in the outer zones. The temperature of the inner wall, which is made thin to ensure good heat transmission to the cooling agent, increases under the thermal load of the combustion space or of the nozzle due to the hot combustion gases, seeks to expand, but it is prevented from doing so by the counterpressure of the cold, rigid outer wall via the webs. As a result, the material of the inner wall flows in the direction of the transition areas to the webs. The longer the combustion time, the more pronounced is this effect. It stops only when the thermally induced stresses have decreased to the limit of elasticity. Thus, the radial wall thickness of the inner wall, which is thin anyway, decreases further approximately in the middle between the webs.

In the case of cutoff of the engine, the combustion is first terminated in the combustion space for safety reasons by shutting off the oxygen supply, whereas the hydrogen flowing through the cooling channels still continues to flow briefly. The thin inner wall is immediately cooled intensely because of its low heat capacity, which now leads to a high tensile load in it. This may lead to cracking in the weakened middle zones of the inner wall in a relatively short time, at least after repeated start-ups and prolonged burn times, and this cracking acutely jeopardizes the function of the combustion chamber or the nozzle and may lead to their complete destruction.

The manufacture of a regeneratively cooled rocket combustion chamber by electroforming by means of an electroplating core is described in DE-PS 21 37 109. The cooling structure manufactured in this manner has a thin inner wall, a thick, stable outer wall, and a plurality of webs, which extend radially between the inner wall and the outer wall, divide the intermediate space into a corresponding number of cooling channels, and mechanically support the inner wall. To reduce the thermal stresses in the area of the inner wall/webs, there are slots which are open toward the hot gas side and extend through the inner wall and the centers of the webs into the area of the outer wall. The inner wall, which is thus divided into a plurality of narrow strips with open "expansion joints" between them, is thus able to expand and contract relatively freely, i.e., to adapt itself to the thermal conditions. However, it should be borne in mind that the hot gases can penetrate into the gaps at least temporarily, so that hot gases are admitted to each cooling channel from one of three sides (1×inner wall, 2×webs). This results in an—at least temporarily—increased thermal load of the cooling structure. The corner areas of the inner wall/web are especially critical in terms of design. Due to the known, small dimensions of the cooling channel cross sections (a few mm in height and width), it is practically impossible to select exactly constant wall thicknesses, corner radii, etc., here. Weak points are thus unintentionally "preprogrammed," along with the risk of burnout and even structural failure. To counteract this risk, the middle wall thickness must again be increased, or the accuracy of manufacture must be improved. It might be obvious that the advantage of this design, which was initially suspected, is extensively eliminated by the above-mentioned drawbacks.

SUMMARY AND OBJECTS OF THE INVENTION

In light of these prior-art solutions and their drawbacks, the primary object of the present invention is to provide a wall structure for fuel-cooled engine walls, which has a substantially longer life or reliability of operation due to a considerable reduction in the thermally induced stresses with a moderate design effort.

According to the invention, a wall structure for fuel-cooled engine walls is provided, especially for cryogenic fuel-cooled combustion chamber and thrust nozzle walls of rocket engines, with a cooling structure. The cooling structure comprises an inner wall, to which hot gas is admitted during the operation, an outer wall, which is located at a spaced location therefrom and is colder during the operation, as well as a plurality of webs which connect the inner wall to the outer wall and divide the hollow space present between these into a large number of cooling channels. A support structure is provided which joins the outer wall and comprises at least a mechanically stable outer jacket. The cooling structure is slotted from the outside in the area of each web. The slots lead through the outer wall and the centers or central region of the webs into the area of the inner wall. The support structure is designed as an elastically nonrigid support structure at least in the area joining the cooling structure and/or is located at a distance from the cooling structure.

The cooling structure of the wall structure according to the present invention is slotted from the outside, i.e., the "cold side," so that the hot gas-side inner wall is preserved as a smooth, uninterrupted flow contour.

The support structure is made as an elastically nonrigid structure at least in the area adjoining the cooling structure and/or is located at a spaced location from the cooling structure.

Considered in itself, the cooling structure is able to expand and contract extensively in a stress-free manner, because the multiply slotted outer wall and the slotted webs do not essentially hinder the thermal movements of the thin, critical inner wall. In conjunction with the support structure, which is elastically nonrigid at least in some areas and/or is located at a spaced location, the changes in the dimensions of the cooling structure, which are induced thermally—and mechanically (pressure of hot gas)—are limited/hindered only just to the extent as it is necessary for absorbing and limiting the loads. As a result, the stresses induced are kept within acceptable limits, and permanent deformations and flow of material in the cooling structure are extensively avoided.

If a defined distance is initially present between the cooling structure and the support structure, it should be selected to be such that the cooling structure will be in contact with the support structure without gaps on all sides during operation, i.e., in the thermally expanded state and under load, so that the support structure will be able to unrestrictedly assume its mechanical support function. Under short-term transient operating conditions in which there is a gap between the cooling structure and the support structure, i.e., when the support structure is absent or limited, care should be taken to prevent the cooling structure from being mechanically overloaded.

The outer jacket may be arranged on the outer wall of the cooling structure directly or via a thin, heat-insulating separating layer and comprises an elastically nonrigid material or composite. The outer jacket may be designed as a rigid outer jacket, and an intermediate layer comprising an elastically nonrigid material or composite may be arranged between the outer wall and the outer jacket. The outer jacket may also be designed as a rigid outer jacket arranged at a distance (A) from the outer wall. The space between the outer wall and the outer jacket may have at least one volumetric, pressure-transmitting connection to the hot gas space.

The outer jacket may comprise a fiber composite, e.g., glass fiber- or aramid fiber-reinforced synthetic resin, which has a modulus of elasticity of about 10,000 to 20,000 N/mm², and a heat-insulating separating layer comprising a material based on polytetrafluoroethylene (PTFE) or a comparably heat-resistant plastic. The intermediate layer preferably has a modulus of elasticity of about 10,000 to 20,000 N/mm² and consists of, e.g., dross.

The wall elements of the cooling structure (inner wall, webs, outer wall) preferably comprise copper and consist of copper and/or a copper alloy, e.g., with the components copper, silver and zirconium. The outer jacket may comprise stainless steel, nickel or a nickel alloy, e.g., Inconel.

According to a further feature of the invention, the inequality $$\frac{t+s_a}{b/2} \geq 4$$

applies to the geometry of the cooling structure, and that $s_i$ is approximately equal to $s_a$, wherein "t" is the height of the cooling channel (distance between the inner wall and the outer wall), "$s_a$" is the thickness of the said outer wall, "b" is the thickness of the webs, and "$s_i$" is the thickness of the inner wall.

The present invention will be explained in greater detail below on the basis of the drawings. In simplified representations, which are not true to scale.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
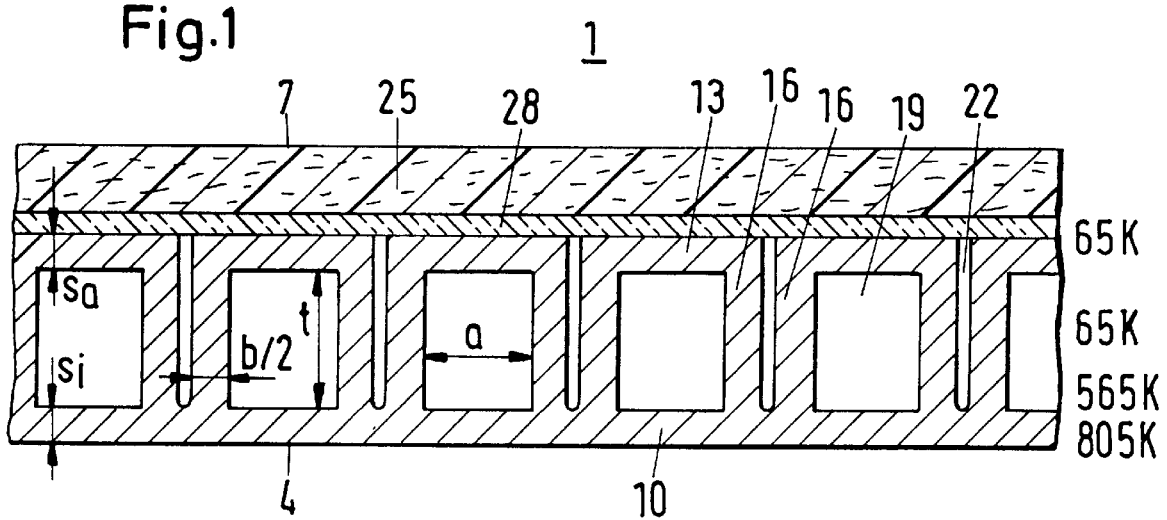
FIG. 1 is a partial cross sectional view of a wall structure with adjacent, nonrigid outer jacket.

Referring to the drawings in particular, the invention comprises a wall structure for fuel-cooled engine walls, especially for cryogenic fuel-cooled combustion chamber and thrust nozzle walls of rocket engines. The cooling structure partial cross sections shown in all three figures show, for simplicity's sake, wall structures with (which appear to be) flat outer, inner and intermediate contours. It is clear to the person skilled in the art that these are usually made curved in reality, preferably as concentric circular lines. The hot gas side (inner side) is consistently at the bottom and the cold side (outer side) is consistently at the top in each figure.

The wall structure 1 according to FIG. 1 can be divided at first into two functional areas, namely, the cooling structure 4 and the support structure 7. The former comprises the cooling channel system and thus the inner wall 10, the slotted outer wall 13, the webs 16, the slots 22, and the cooling channels 19. The cooling structure 4 preferably consists of copper or a copper alloy for reasons of temperature stability and thermal conductivity. The slots 22 extend between the cooling channels 19 from the outside (top) into the area of the inner wall 10, where they end in a rounded contour, which is favorable in terms of stress. The webs 16 can thus be considered to be deeply slotted single webs or as narrowly spaced double webs, and the first view is preferred here. However, this is technically irrelevant.

The support structure 7 consists of two layers here and comprises the supporting, mechanically loadable outer jacket 25 and the heat-insulating separating layer 28. All layers are in contact with one another without gaps. The outer jacket 25 consists of a fiber composite, e.g., glass- and/or aramid fiber-reinforced synthetic resin, with a modulus of elasticity of about 10,000 to 20,000 N/mm² of the composite. Thus, on the one hand, it has sufficient elasticity so as not to excessively limit the thermally induced dimensional changes/deformations of the cooling structure, and, on the other hand, it has a sufficient mechanical strength to absorb the loads resulting from the hot gas pressures. The separating layer 28 consists of, e.g., a TELFLON™ layering/coating and is used as a thermal barrier. Depending on the properties of the material of the outer jacket 25, this separating layer 28 may also be omitted. Typical operating temperatures are indicated at the right-hand margin of FIG.

1. The mean operating temperature of the inner wall 10 is thus about $$685K\left(\frac{805+565}{2}\right).$$

The temperature difference from the outer wall 13 is thus 620 K (685–65). It becomes clear that this great difference would lead to correspondingly high thermal stresses in the area of the inner wall in the case of rigid design of the outer wall or of the support structure, but this is prevented by the present invention.

The left-hand part of FIG. 1 contains arrowheads with letter symbols, which indicate the geometric conditions in the cooling structure 4. Specifically, "a" designates the width of the cooling channel, "t" the height of the cooling channel, "b/2" the thickness of the web on both sides of the webs 22, "$s_i$" the thickness of the inner wall 10, and "$s_a$" the thickness of the outer wall 13. Typical dimensions in reality would be:

$s_1$=0.6–1 mm
$s_a$=0.6–1 mm
a=1–2 mm
t≧2 mm
b=1–2 mm.

With $s_i \approx s_a$, the following inequality should be true to keep the bending stresses in the slotted webs low:

$$\frac{t+s_a}{b/2} \geq 4$$

Figure 2:
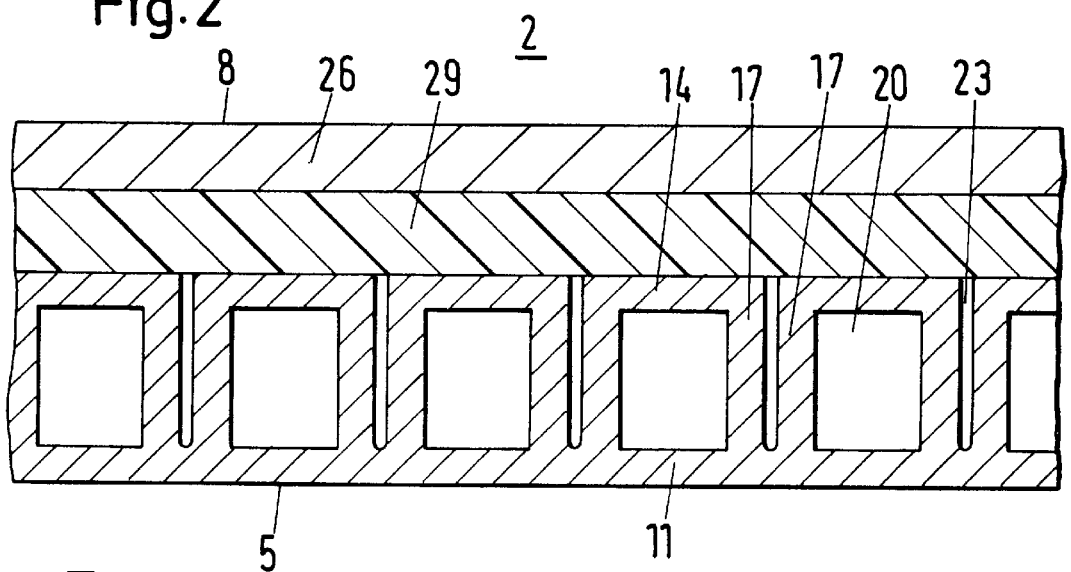
FIG. 2 is a partial cross sectional view of a wall structure with an adjacent, nonrigid intermediate layer and rigid outer jacket.

The wall structure according to FIG. 2 has a cooling structure 5 with an inner wall 11, an outer wall 14, webs 17, slots 23, and cooling channels 20, which have the same design as those according to FIG. 1.

The essential difference from FIG. 1 is the design of the support structure 8, which consists here of a—relatively—rigid outer jacket 26 and an elastically nonrigid intermediate layer 29. The outer jacket 26 preferably consists of solid metal having a high modulus of elasticity, e.g., nickel, a nickel alloy, or stainless steel. In contrast, the intermediate layer should have a modulus of elasticity of only about 10,000 to 20,000 N/mm², and it may consist, e.g., of a dross. Consequently, there is a certain functional division here, which leads to even more favorable stress conditions at improved support/dimensional stability. However, an increase in the thickness of the structure and possibly in the weight of the structure is to be expected.

As can be recognized, all layers are in contact with each other without gaps in this case as well.

Figure 3:
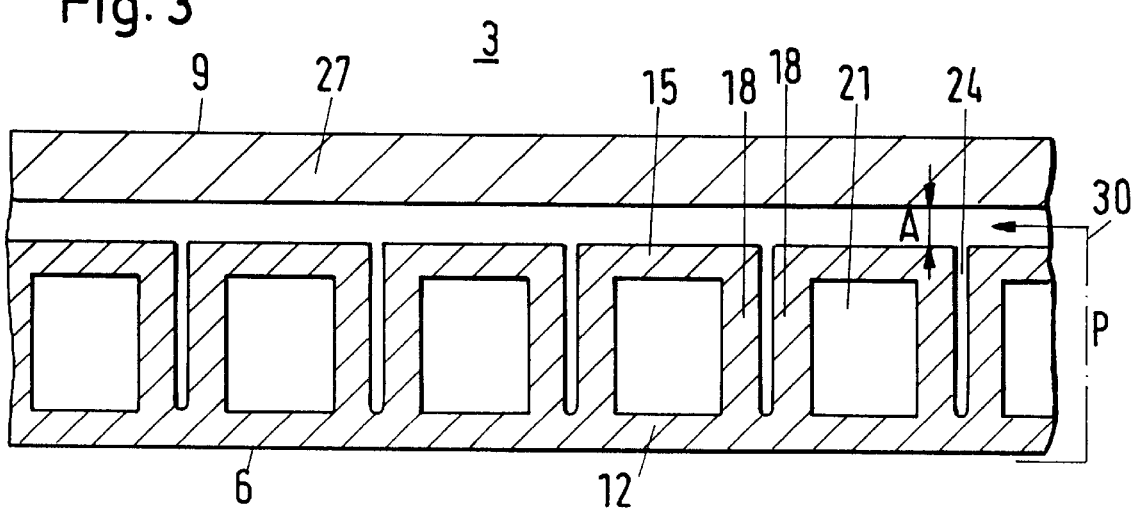
FIG. 3 is a partial cross sectional view through a wall structure with a rigid outer jacket located at a spaced location.

In contrast, FIG. 3 shows a wall structure 3, which operates with a defined gap A between the cooling structure 6 and the support structure 9.

The cooling structure 6 with the inner wall 12, the outer wall 15, the webs 18, the slots 24 and the cooling channels 21 has exactly the same design as in the first two figures.

The support structure 9 comprises only a rigid, e.g., metallic outer jacket 9, which is located at a defined distance A from the slotted outer wall 15 in the inactive, unloaded state of the wall structure 3. This distance A is selected to be such that it becomes "zero" during operation, i.e., the cooling structure 6 is in contact with the supporting outer jacket 27 on all sides. Operating states may temporarily occur in which the cooling structure 6 is subject to heavy mechanical load due to the hot gas pressures while it is not yet/no longer in contact with the support structure 9. Provisions shall be made in such cases for the cooling structure 6 to undergo a nonpermanent, i.e., plastic overexpansion. A volumetric connection 30 from the hot gas area to the space between the outer wall 15 and the outer jacket 27 is present for this purpose in the case described. Thus, the same pressure p occurs on both sides (above and under in this case), so that there is practically no pressure-induced tendency to expand in the circumferential direction. The mechanical loads caused by the internal pressure in the cooling channel are less critical in this connection and are additionally reduced by the approximately all-round admission of pressure to the cooling channels from the outside (pressure p also acts in the slots 24).

Finally, it shall also be pointed out that it is at the discretion of the person skilled in the art to combine the individual solutions according to FIGS. 1, 2 and 3 in a suitable manner.

While specific embodiments of the invention have been shown and described in detail to illustrate the application of the principles of the invention, it will be understood that the invention may be embodied otherwise without departing from such principles.

What is claimed is:

1. A wall structure for fuel-cooled engine walls, comprising:

a cooling structure with an inner wall, to which hot gas is admitted during engine operation, an outer wall, which is located at a spaced location therefrom and is colder than said inner wall during the operation, as well as a plurality of webs connecting said inner wall to said outer wall, said webs dividing a hollow space present between said inner wall and said outer wall into a large number of cooling channels, said cooling structure being provided with slots extending from an outside surface of said outer wall in an area of each said web toward said inner wall, wherein each of said slots extend through said outer wall and pass through a corresponding one of said webs to an area adjacent to said inner wall to separate an area of said outer wall on one side of each slot from an area of said outer wall on another side of said each slot, allowing expansion and contraction of said inner wall in an extensively stress free manner; and a support structure, connected to the outer wall.

2. A wall structure in accordance with claim 1, further comprising: an outer jacket arranged directly on said outer wall of said cooling structure and consisting essentially of an elastically nonrigid material or an elastically nonrigid composite.

3. A wall structure in accordance with claim 1, further comprising: an outer jacket arranged on said outer wall of said cooling structure via a thin, heat-insulating separating layer, said outer jacket consisting essentially of an elastically nonrigid material or an elastically nonrigid composite.

4. A wall structure in accordance with claim 3, wherein said outer jacket consists of a fiber composite which has a modulus of elasticity of about from 10,000 to 20,000 N/mm², and said heat-insulating separating layer consists of one of a material based on polytetrafluoroethylene (PTFE) and a comparably heat-resistant plastic.

5. A wall structure in accordance with claim 4, wherein said fiber composite is one of glass fiber- or aramid fiber-reinforced synthetic resin.

6. A wall structure in accordance with claim 1, further comprising: an outer jacket designed as a rigid outer jacket, and an intermediate layer consisting of an elastically nonrigid material or an elastically nonrigid composite arranged between said outer wall and said outer jacket.

7. A wall structure in accordance with claim 6, wherein said intermediate layer has a modulus of elasticity of about 10,000 to 20,000 N/mm².

8. A wall structure in accordance with claim 6, wherein said intermediate layer has consists of dross.

9. A wall structure in accordance with claim 1, further comprising: an outer jacket designed as a rigid outer jacket and is arranged at a distance from said outer wall defining a space between said outer wall and said outer jacket and said space between said outer wall and said outer jacket has at least one volumetric, pressure-transmitting connection to the hot gas space.

10. A wall structure in accordance with claim 1, wherein said wall elements of said cooling structure comprises copper.

11. A wall structure in accordance with claim 10, wherein wall elements of said cooling structure consist essentially of one of copper and a copper alloy.

12. A wall structure in accordance with claim 11, wherein said copper alloy includes the components copper, silver and zirconium.

13. A wall structure in accordance with claim 1, wherein said outer jacket is formed of a material selected from the group consisting of stainless steel, nickel and a nickel alloy.

14. A wall structure in accordance with claim 13, wherein said nickel alloy is Inconel.

15. A wall structure in accordance with claim 1, wherein the inequality $$\frac{t+s_a}{b/2} \geq 4$$

applies to the geometry of the cooling structure, and that $s_i$ is approximately equal to $s_a$, wherein "t" is the height of the cooling channel (distance between the inner wall and the outer wall), "$s_a$" is the thickness of said outer wall, "b" is the thickness of said webs, and "$s_i$" is the thickness of said inner wall.

16. A wall structure for fuel-cooled engine walls, for cryogenic fuel-cooled combustion chamber and thrust nozzle walls of rocket engines, the wall structure comprising:

a cooling structure with an inner wall, to which hot gas is admitted during engine operation, an outer wall, which is located at a spaced location therefrom and is colder than said inner wall during the operation, as well as a plurality of webs connecting said inner wall to said outer wall, said webs dividing said hollow space present between these into a large number of separate cooling channels, said cooling structure being provided with slots extending over said outer wall and from an outside surface of said outer wall in an area of each said web toward said inner wall, wherein each of said slots extend through said outer wall and pass through a central portion of a corresponding one of said webs to an area adjacent to said inner wall, each of said slots extending over said outer wall providing a separation of said outer wall into portions provided on each side of an associated slot, allowing expansion and contraction of said inner wall in an extensively stress free manner; and a support structure, connected to the outer wall, said outer wall comprises a mechanically stable outer jacket, said support structure being an elastically nonrigid support structure at least in an area joining said cooling structure.

17. A wall structure for fuel-cooled engine walls, for cryogenic fuel-cooled combustion chamber and thrust nozzle walls of rocket engines, the wall structure comprising:

a cooling structure with an inner wall, to which hot gas is admitted during rocket engine operation, an outer wall, which is located at a spaced location therefrom and is colder than said inner wall during rocket engine operation, as well as a plurality of webs connecting said inner wall to said outer wall, said webs dividing said hollow space present between these into a plurality of cooling channels thermal expansion and contraction means for expansion and contraction of said inner wall in an extensively stress free manner, said thermal expansion and contraction means including slots extending from the outside in an area of each said web, wherein each of said slots extend through said outer wall and pass through a central portion of a corresponding one of said webs to an area adjacent to said inner wall and divide said outer wall into regions on one side of each slot and regions on another side of said each slot; and a support structure, connected to the outer wall, said outer wall comprises a mechanically stable outer jacket, said support structure being located at a distance from said cooling structure.

* * * * *